US012252761B2

(12) United States Patent
Galeazzi

(10) Patent No.: US 12,252,761 B2
(45) Date of Patent: Mar. 18, 2025

(54) SYSTEM AND PROCESS FOR THE RECOVERY OF TITANIUM, TITANIUM ALLOY, ZIRCONIUM AND ZIRCONIUM ALLOY SCRAP

(71) Applicant: Co.fer.M S.p.a., Jesi (IT)

(72) Inventor: Gianluca Galeazzi, Falconara Marittima (IT)

( * ) Notice: Subject to any disclaimer, the term of this patent is extended or adjusted under 35 U.S.C. 154(b) by 424 days.

(21) Appl. No.: 17/728,403

(22) Filed: Apr. 25, 2022

(65) Prior Publication Data

US 2022/0243301 A1 Aug. 4, 2022

Related U.S. Application Data

(63) Continuation-in-part of application No. 17/296,620, filed as application No. PCT/EP2019/080296 on Nov. 5, 2019, now Pat. No. 12,012,645.

(30) Foreign Application Priority Data

Dec. 12, 2018 (IT) ........................ 102018000011004

(51) Int. Cl.

| | |
|---|---|
| ***C22B 7/00*** | (2006.01) |
| ***B03C 1/30*** | (2006.01) |
| ***C22C 1/02*** | (2006.01) |
| ***C22C 14/00*** | (2006.01) |
| ***C22C 16/00*** | (2006.01) |

(52) U.S. Cl.

CPC ................ *C22B 7/003* (2013.01); *B03C 1/30* (2013.01); *C22C 1/02* (2013.01); *C22C 14/00* (2013.01); *C22C 16/00* (2013.01); *B03C 2201/20* (2013.01)

(58) Field of Classification Search

None

See application file for complete search history.

(56) References Cited

U.S. PATENT DOCUMENTS

| | | | |
|---|---|---|---|
| 4,108,644 | A | 9/1978 | Walberg et al. |
| 4,363,722 | A | 12/1982 | Dresty et al. |

FOREIGN PATENT DOCUMENTS

| | | | |
|---|---|---|---|
| CN | 102899495 | A | 1/2013 |
| CN | 107201446 | A | 9/2017 |
| JP | 2009226302 | A | 10/2009 |

OTHER PUBLICATIONS

International Search Report for corresponding PCT/EP2019/080296 dated Jan. 6, 2020.

Written Opinion of the International Searching Authority for corresponding PCT/EP2019/080296 dated Jan. 6, 2020.

Dos Reis et al., "Recycling and Melting Process of the Zirconium Alloy Chips", Oct. 27, 2017, Retrieved from the Internet: URL:https://inis.iaea.org/collection/NCLCollectionStore/_Public/49/018/49018141.pdf?r=1&r=1 ** See Written Opinion.

*Primary Examiner* — Anthony M Liang

(74) *Attorney, Agent, or Firm* — Egbert, McDaniel & Swartz, PLLC

(57) ABSTRACT

A system for the recovery of titanium, titanium alloys, zirconium and zirconium alloys is disclosed. The system is fed with a mixture of chips including titanium chips, titanium alloy chips, zirconium chips and zirconium alloy chips, ferromagnetic chips and electrically conductive non-ferromagnetic chips. The system has at least one magnetic separator, a drying device and an Eddy current separator.

7 Claims, 2 Drawing Sheets

SYSTEM AND PROCESS FOR THE RECOVERY OF TITANIUM, TITANIUM ALLOY, ZIRCONIUM AND ZIRCONIUM ALLOY SCRAP

CROSS-REFERENCE TO RELATED APPLICATIONS

The present application is a continuation-in-part of U.S. application Ser. No. 17/296,620, filed on May 21, 2021. U.S. application Ser. No. 17/296,620 is the U.S. National Stage of PCT/EP2019/080296, filed Nov. 5, 2019.

BACKGROUND OF THE INVENTION

1. Field of the Invention

The present patent application for industrial invention relates to a system and a process for the recovery of titanium, titanium alloy and/or zirconium, zirconium alloy scrap contained in a mixture of contaminating metal chips.

The inventive idea is the result of a necessity that is currently encountered in the production of finished pieces made of titanium or zirconium, wherein chips, scrap and pieces that are considered as "waste" are generated during the processing of these materials.

In particular, the applicant devised the present invention for the recovery of titanium, titanium alloys, zirconium and zirconium alloys and of all metals and alloys that are inert to magnetic fields.

2. Description of Related Art Including Information Disclosed Under 37 CFR 1.97 and 37 CFR 1.98

As it is known, titanium and other inert materials are worked with milling cutters and other machine tools in such a way to obtain finished parts suitable for being used in the aeronautical, biomedical and automotive fields.

The milling cutters and the other machine tools are operated according to a subtractive method because material is removed from the initial workpiece in order to obtain a finished piece.

The removal of material tends to generate a large amount of scrap, and especially chips, in the vicinity of the machine.

In general, the same milling cutters used to work inert materials (titanium, zirconium) are used to work other materials, such as aluminium, bronze, copper, iron, nickel-based alloys and the like.

The inaccurate cleaning of the machine will inevitably generate a mixture of chips that comprises a plurality of chips of different elements in the vicinity of the machine.

Therefore, if the machine is not properly cleaned, the processing of titanium (or zirconium) will generate a mixture of chips and scrap with chips of other contaminating materials, such as aluminium, copper, bronze, and magnetic alloys, in addition to titanium and/or zirconium).

A recovery process is necessary to recover and reuse the contaminated titanium.

As it is known, the factories and the companies that process titanium and zirconium seldom have plans for the recovery of materials and do not implement suitable procedures to clean the machines in order to obtain titanium or zirconium that is not mixed with other materials. In view of the above, the material generated from the processing operations is considered as a low value material and is used for less valuable applications.

U.S. Pat. No. 4,363,722 discloses a process and an apparatus specifically directed to the removal of both magnetic and non-magnetic tungsten carbide chips, and other magnetic and non-magnetic high density inclusions, from titanium machining scrap.

U.S. Pat. No. 4,108,644 discloses a method for manufacturing reactive metal alloys using revert raw materials as a principal raw material source.

CN 107201446 discloses a method for separating scrap in non-magnetic alloys.

The limited culture of the market for the recovery of said materials urged the applicant to devise a system for the processing and the recovery of titanium, titanium alloys, zirconium and zirconium alloys in such a way to recover the machined material without losing its economic value because of the mixing with other contaminating metal materials. It must be noted that the system and the process devised by the applicant are innovative and have no antecedents in the prior art.

The purpose of the present invention is to overcome the aforementioned drawbacks by devising a system and a process for the processing and the recovery of titanium and titanium alloys, in order to obtain titanium, titanium alloys, zirconium and zirconium alloys that are not mixed with contaminating elements.

Another purpose of the present invention is to devise a process for processing and separating titanium chips, titanium alloy chips, zirconium chips and zirconium alloy chips from contaminating elements.

An additional purpose of the present invention is to devise a system that is inexpensive and a process that is simple to implement.

These and other objects and advantages of the present invention will become apparent from a reading of the attached specification and appended claims.

BRIEF SUMMARY OF THE INVENTION

The present invention is a system for the recovery at least part of chips of titanium, titanium alloys, zirconium and zirconium alloys present in a mixture of chips, wherein the mixture of chips includes, besides at least some of said elements or alloys, ferromagnetic and/or electrically conductive non-ferromagnetic chips. The system includes a first magnetic separator to extract ferromagnetic chips from said mixture of chips. The system also includes an Eddy current separator to extract the electrically conductive non-ferromagnetic chips from said mixture of chips disposed downstream said first magnetic separator, and second magnetic separator disposed downstream said Eddy current separator.

In an embodiment, the system comprises a crushing machine suitable to crush and break the chips of said mixture of chips, and disposed upstream all the magnetic separators that the scraps or chips meet during the process. In an embodiment, said crushing machine consists of a rotary mill with rotating blades.

In an embodiment, the system further comprises a drying device placed upstream said Eddy current separator. The drying device may comprise a centrifuge. The drying device may comprise a drier.

In an embodiment, the system comprises a monitoring equipment to monitor the process, the monitoring equipment including means to collect and analyse the quality of samples representative of the quality of the selected chips. In this embodiment, the system may comprise: a mixer suitable for mixing a significant quantity of chips extracted from said mixture of chips in such a way to generate a sample of said mixture of chips; a melting furnace suitable for melting said quantity of chips; and a chemical analyser to chemically analyse the composition of said sample of said mixture of chips.

In an embodiment, the system further comprises an additional magnetic separator disposed downstream the possible crushing machine and upstream the first magnetic separator.

The present invention is also a process for the recovery of titanium, titanium alloys, zirconium and zirconium alloys present in a mixture of chips comprising titanium chips and/or titanium alloy chips and/or zirconium chips and/or zirconium alloy chips, and further comprising ferromagnetic chips and/or electrically conductive non-ferromagnetic chips. The process comprises the following steps: a decontamination step (D), wherein said mixture of dry chips obtained in the drying step (E) passes in an Eddy current separator in order to eject electrically conductive non-ferromagnetic chips from said mixture of dry chips; and first and second demagnetization steps (M1, M2), respectively before and after said decontamination step (D), wherein ferromagnetic chips are ejected from said mixture of chips (H).

In an embodiment, the process further comprises an additional demagnetization step (M3) before said first demagnetization step (M1).

In an embodiment, the process further comprises a crushing step (F) before said demagnetization steps (M1, M2; M1, M2, M3).

In an embodiment, the process further comprises a drying step (E) before said decontamination step (D).

In an embodiment, the process further comprises an inspection step, wherein said mixture of chips delivered after said decontamination step (D) or after said second demagnetization step (M2) is inspected.

In an embodiment, the process the inspection step comprises the following sub-steps: an extraction sub-step (C1), wherein a significant quantity of chips is extracted from the mixture of chips (H); a mixing sub-step (C2) wherein said quantity of chips extracted in said extraction step (C1) is mixed in such a way to generate a sample that is representative of the mixture of chips (H) collected; a melting sub-step (C3), wherein said quantity of chips extracted in said extraction sub-step (C1) is melt in a melting furnace; and an analysis and evaluation step (C4), wherein said sample is chemically analysed with a chemical analyser.

In an embodiment, after said inspection step, a decontamination step (D), and a new inspection step is performed.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

BRIEF DESCRIPTION OF THE SEVERAL VIEWS OF THE DRAWINGS

For clarity purposes, the description of the system according to the invention continues with reference to the appended drawings, which only have an illustrative, not limiting value, wherein.

DETAILED DESCRIPTION OF THE INVENTION

The system (100) of the invention is used for the recovery of titanium, titanium alloys, zirconium and zirconium alloys. More precisely, the system (100) is fed with a mixture of chips (H) comprising titanium chips and/or titanium alloy chips, and/or zirconium chips and/or zirconium alloy chips, as well as ferromagnetic chips and/or electrically conductive non-ferromagnetic chips. The material is processed in order to extract the ferromagnetic chips and the electrically conductive non-ferromagnetic chips from said mixture of chips (H).

The system (100) has the scope of selecting titanium and zirconium metals and alloys removing the ferromagnetic chips and the electrically conductive non-ferromagnetic chips from said mixture of chips (H) obtaining a mixture of chips that is exclusively or almost exclusively composed of the titanium, titanium alloys, zirconium and zirconium alloys that were comprised in that mixture of chips (H).

It must be noted that the system (100) is not able to separate titanium and its alloys form zirconium and its alloy so all chips of this nature are selected but not separated from each other.

Figure 1:
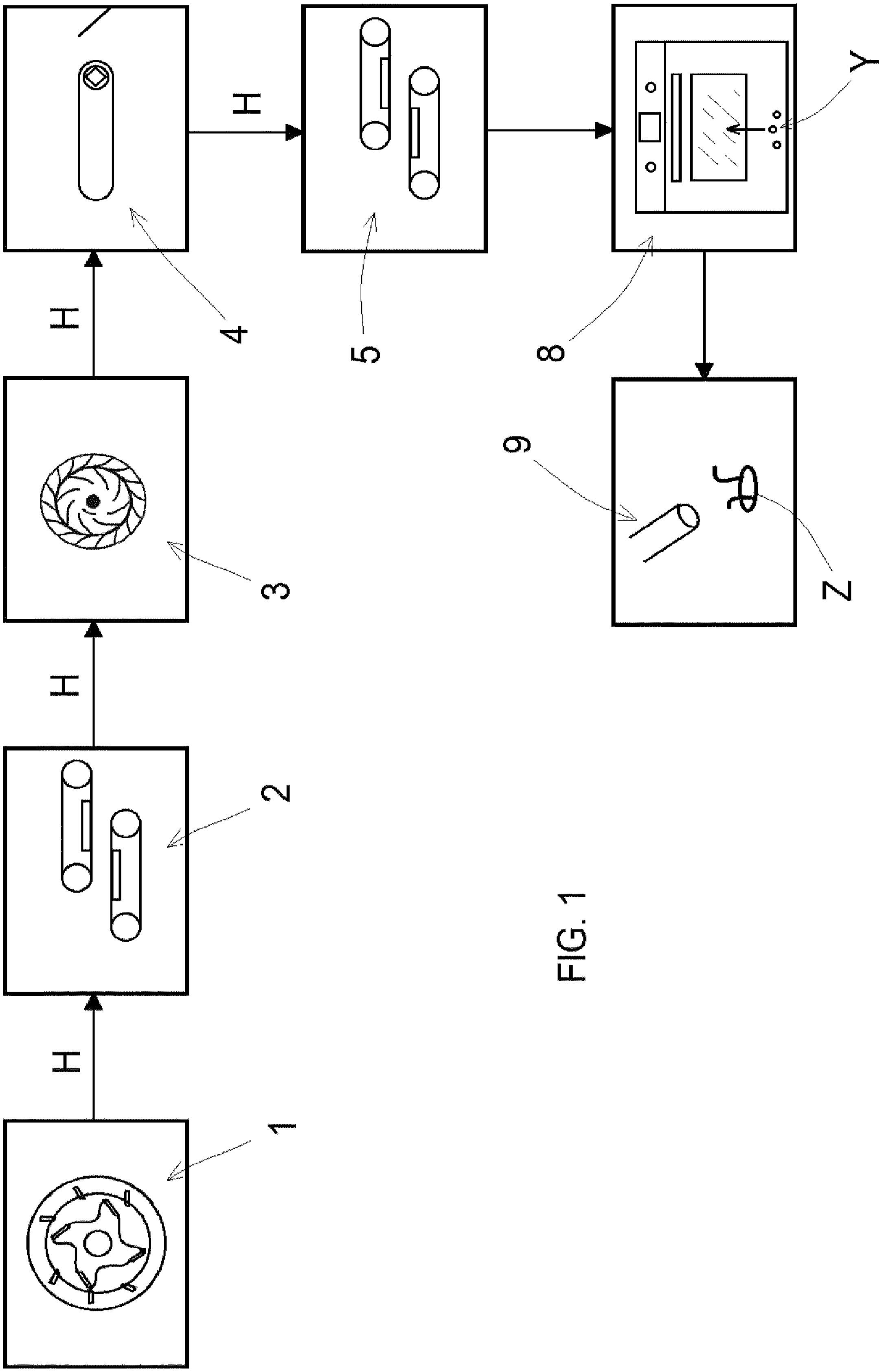
FIG. 1 is a block diagram of the system according to the invention.

With reference to FIG. 1, the system (100) of the invention for the recovery of titanium and zirconium and their alloys comprise a first magnetic separator (2) according to the prior art and a second magnetic separator (5) suitable to remove the ferromagnetic chips from said mixture of chips (H).

Each magnetic separator (2, 5) can be an ordinary drum magnetic separator or an ordinary belt magnetic separator.

The belt magnetic separator is preferably used as magnetic separator (2, 5) in the present invention.

The system (100) of the invention also comprises an Eddy current separator (4) to extract the electrically conductive non-ferromagnetic chips from said mixture of chips (H).

The Eddy current separator (4) comprises a vibrating conveyor belt disposed in horizontal position and driven by two end rollers.

One of said two end rolls contains a magnetic rotor that generates a high-frequency and high-density magnetic field. Said magnetic field induces an Eddy current in the chips of electrically conductive non-ferromagnetic material (aluminium, bronze, copper, lead). The Eddy current creates a magnetic field that opposes the source magnetic field of the magnetic rotor, moving them away from the source of the magnetic rotor. In view of the above, when passing in the vicinity of the rotor, the electrically conductive non-ferromagnetic chips are lifted in the air and released by the vibrating conveyor belt with a different trajectory compared to those of the titanium chips, the titanium alloy chips, the zirconium chips and the zirconium alloy chips.

The release of the chips with different trajectories permits the separation of the electrically conductive non-ferromagnetic chips from the titanium chips, the titanium alloy chips, the zirconium chips, and the zirconium alloy chips.

The Eddy current separator (4) is placed downstream the first magnetic separator (2) and upstream the second magnetic separator (5).

Advantageously, the system (100) may also comprise a crushing machine (1) for reducing in chips the scraps to be processed. The crushing machine (1) is necessary if the scraps to be processed have a too large size.

The scope of the crushing machine (1) is crushing the large-sized chips possibly present in the scraps produced. e.g., by machines that make roughing operations on bars or slabs. The crushing machine (100) must reduce the size of the chips in the mixture of chips (H) to dimensions suitable for being processed with said magnetic separators (2, 5) and with said Eddy current separator (4).

When present, then, such crushing machine (1) is placed upstream all the magnetic separators (2, 5) that the scraps or chips (H) meet during the process applied to them.

The crushing machine (1) may consists in a rotary mill with rotating blades.

Advantageously the system may also comprise a drying device (3) to extract water and liquids from the chips of said mixture of chips (H). It must be noted, indeed, that the chips generated by the machines are generally impregnated with liquids and refrigerant oils used to refrigerate the materials while they are worked by the machines (mills, lathes, and the like) and that in such conditions the mixture of chips (H) to be processed to perform the selection could be received.

The drying device (3), when present, is placed upstream said Eddy current separator (4); and preferably downstream the first magnetic separator (2).

According to a first embodiment, this possible drying device (3) comprises a centrifuge.

This centrifuge comprises a centrifugation chamber that is constantly fed with the mixture of chips (H) at a low speed. The centrifuge comprises a rotating body disposed inside the centrifugation chamber.

The rotating body comprises a disk with a truncated-conical shape and a central outlet that delivers the mixture of chips from said centrifugation chamber.

The rotation extracts the liquids contained in the chips disposed inside the rotating body by means of the centrifugal force. Said liquids pass through micro-holes provided in the rotating body and are conveyed separately from said mixture of chips (H), which is ejected from the rotating body through said central hole.

Preferably, said rotating body of the centrifuge is rotated at a speed of 1.500 revolutions per minute.

According to a second embodiment of the invention, instead of a centrifuge, the possible drying device (3) comprises an ordinary dryer that dries said mixture of chips (H) at a drying temperature comprised between 90° C. and 120° C.

The drying with the centrifuge or the drying device permits to obtain a mixture of dry chips (H), in which each chip of the mixture of chips (H) has a percentage of liquids lower than 3-5% of the mass of the chip.

The drying of the mixture of chips (H) is necessary to prevent the particles of contaminated material from adhering to the alloy chips or to the metal chips to be processed when the mixture of chips (H) passes in the Eddy current separator (4) and then it must be placed upstream the Eddy current separator (4).

The drying device (3) is not necessary when the scraps to be processed already have such or lower liquids percentage or, in any case, when the chips (H) do not adhere each other.

The system (100) may also comprise a monitoring equipment to monitor the process comprising means to collect and analyse samples representative of the quality of the selection performed, i.e. of the percentage presence of not whished metals, along the system's (100) machines where the samples are preferably collected downstream the Eddy current separator (4) or the second magnetic separator (5).

With reference to FIG. 1, the monitoring equipment may advantageously comprise a melting furnace (8) suitable for melting a "significant" quantity of chips (Y) in such a way to generate a "sample" (Z) of the mixture of chips (H) delivered by said magnetic separators (2, 5) and by said Eddy current separator (4). The term "significant" preferably is considered to be at least 50 grams of chips.

Preferably, the melting furnace (8) consists in an arc furnace with non-consumable graphite electrode that operates in an argon atmosphere.

To analyse the sample (Z), the monitoring equipment may use a chemical analyser (9) suitable for detecting and measuring the chemical components contained in said sample (Z) obtained from melting the chips in the melting furnace (8).

Advantageously, the monitoring equipment also comprises a mixer to produce a uniform mixture of chips (H). Preferably, the mixer is a double cone mixer. When loaded with the mixture of chips (H) for approximately 50% of its volume, by means of a rotation similar to the one of a concrete mixer, the double cone mixer produces a uniform mixture of chips (H). In such a way that the "significant" quantity of chips (Y) taken from the mixture of chips (H) is highly representative of the mixture of chips (H), allowing a reliable chemical analysis of the "sample" (Z).

According to a preferred embodiment of the system of the invention, the chemical analyser (9) consists in a quantum meter. By analysing the electromagnetic radiation emitted by the sample (Z), the quantum meter identifies and measures the elements contained in the sample (Z).

Although not shown in FIG. 1, the system may also comprise an additional magnetic separator disposed downstream the possible crushing machine (1) and upstream the first magnetic separator (2).

The mixture of chips is oved and transferred from a machine to another machine of the system (100) manually with trolleys that are transported by a user or, alternatively, with means of transportation that transport the mixture of chips (H) from a machine to another machine, in such a way that the system (100) is an automatic chain system wherein the mixture of chips (H) delivered from the metal working machines is processed by the system (100) with a series of sequential operations without having to manually move the mixture of chips (H) from an element to another element of the system (100).

In particular, said means of transportation comprise a set of conveyor belts that move from an element to another element the mixture of chips (H) progressively selected while other belts remove away what discarded by the system (100). Said conveyor belts are fed by means of hoppers that receive the mixture of chips (H) from the machine installed upstream. For illustrative purposes, the mixture of chips (H) delivered from the centrifuge is loaded in a hopper that delivers the mixture of chips (H) on a conveyor belt that feeds the Eddy current separator (4).

Figure 2:
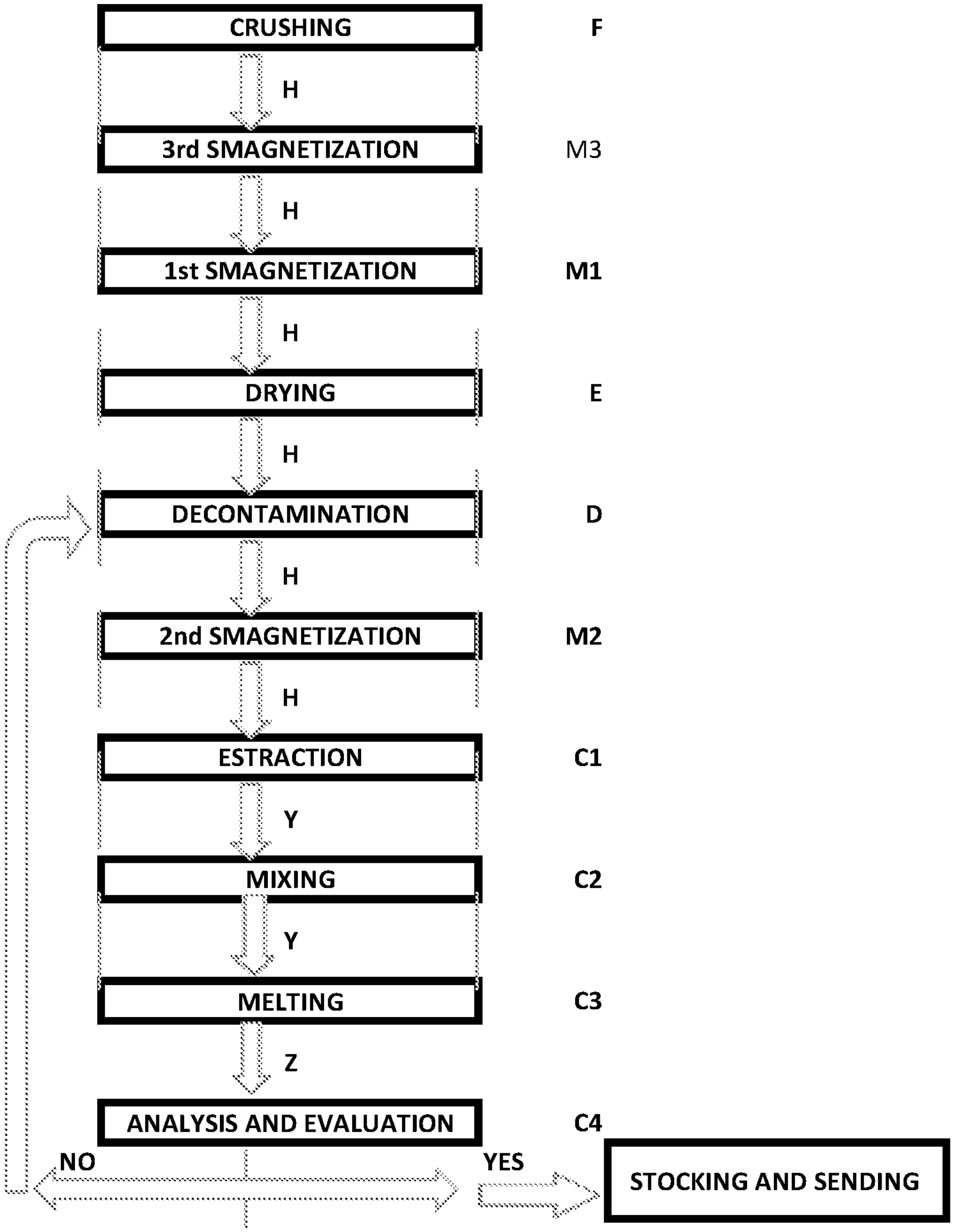
FIG. 2 is a flow chart that illustrates the process for the processing and the recovery of titanium, titanium alloys, zirconium and zirconium alloys according to the invention.

With reference to FIG. 2, a process for the processing and the recovery of titanium, titanium alloys, zirconium and zirconium alloys with the system (100) of the invention illustrated in the preceding description is disclosed.

If necessary, the process initially comprises a step of crushing (F), wherein the chips of the mixture of chips (H) delivered from industrial machines are broken into pieces with suitable dimensions for successive operations.

The mixture of crushed chips (H) is disposed on the magnetic separator (2), which carries out a first demagnetization step (M1), wherein a first portion of ferromagnetic chips is extracted from said mixture of chips (H).

After the first demagnetization step (M1), an optional drying step (E) is carried out with the drying device (3), wherein the mixture of chips (H) is dried and oils and liquids are extracted from the mixture of chips (H).

In the following decontamination step (D), the mixture of dry chips (H) is introduced in said Eddy current separator (4), which carries out a decontamination step (D) wherein the electrically conductive non-ferromagnetic chips are extracted from the mixture of chips (H).

The decontamination step (D) can be carried out repeatedly according to the specifications of the material to be obtained; more precisely, the mixture of dry chips (H) is repeatedly introduced in the Eddy current separator (4).

A second demagnetization step (M2) is carried out after the decontamination step (D) with the second magnetic separator (5), wherein an additional portion of ferromagnetic chips that was not previously extracted during the first demagnetization step (M1) is extracted.

Preferably, the process comprises an additional demagnetization step (M3) after the optional crushing step (F) and before the first demagnetization step (M1).

The redundancy of said demagnetization steps (M1, M2 and eventually M3) delivers a mixture of chips (H) substantially without ferromagnetic chips at the outlet of the system (100).

The decontamination step (D) and/or the second demagnetization step (M2) are preferably followed by an inspection step that comprises several sub-steps, namely: an extraction sub-step (C1), a mixing sub-step (C2), a melting sub-step (C3) and an analysis and evaluation sub-step (C4).

The extraction step (C1) provides for extracting a "significant" quantity of chips (Y) from the mixture of chips (H) processed by the second magnetic separator (5).

The "significant" quantity of chips (Y) extracted from the extraction step (C1) is melt in the melting step (C2), obtaining a sample (Z) of material. Said melting step (C2) is carried out by means of the melting furnace (8).

Then, the sample (Z) obtained from the melting step (C2) is used to carry out said analysis and evaluation step (C4) by means of the chemical analyser (9).

If the values obtained from the analysis and evaluation steps (C4) of the sample (Z) are satisfactory and comply with the requested parameters according to the customer specifications, a stocking and shipping step is carried out (B), wherein the mixture of processed chips is stocked and successively shipped to the customer.

On the contrary, if the values do not comply with the requested parameters, an additional decontamination step (D), demagnetization step (M2) and inspection step must be carried out until the values comply with the specific parameters requested by the customer.

With reference to the preceding description, it appears evident that such a system (100) is suitable for recovering titanium, titanium alloys, zirconium and zirconium alloys without ferromagnetic contaminants and electrically conductive non-ferromagnetic contaminants.

More precisely, said system (100) offers a solution for the recovery of material for all industries and/or workshops that process titanium, titanium alloys, zirconium and zirconium alloys, in which the chips or scrap generated by the working machines (mills, lathes and the like) are usually considered as low value waste. By using the system (100) for processing and recovering purposes, the material considered as "waste" is purified in such a way to obtain a mixture of chips without contaminants that can be reused to produce finished pieces for the aeronautical, biomedical and automotive fields.

Numerous variations and modifications can be made to the present embodiment of the invention, which are within the reach of an expert of the field, falling in any case within the scope of the invention as disclosed by the appended claims.

I claim:

1. A process for recovering titanium, titanium alloys, zirconium and zirconium alloys from a mixture of chips, the mixture of chips including titanium chips, titanium alloy chips, zirconium chips, zirconium alloy chips, ferromagnetic chips, electrically conductive non-ferromagnetic chips or mixtures thereof, the process comprising;

drying the mixture of chips;

demagnetizing the mixture of chips so as to eject ferromagnetic chips from the mixture of chips;

decontaminating the dried mixture of chips after the step of demagnetizing by passing the dried mixture of chips in an Eddy current separator so as to eject electrically conductive non-ferromagnetic chips from the dried mixture of chips; and demagnetizing the decontaminated dried mixture of chips so as to eject ferromagnetic chips from the decontaminated dried mixture of chips.

2. The process of claim 1, further comprising:

demagnetizing the mixture of chips prior as a separate step prior to demagnetizing the mixture of chips so as to further eject ferromagnetic chips of the mixture of chips.

3. The process of claim 1, further comprising:

crushing the mixture of chips prior to at least one of the steps of demagnetizing.

4. The process of claim 1, further comprising:

inspecting the mixture of chips after demagnetizing the mixture of chips and prior to decontaminating the dried mixture of chips.

5. The process of claim 1, further comprising:

inspecting the mixture of chips after decontaminating the dried mixture of chips.

6. The process of claim 4, wherein the step of inspecting comprises:

extracting a quantity of chips from the mixture of chips;

mixing the extracted quantity of chips so as to generate a sample that is representative of the dried mixture of chips;

melting the extracted quantity of chips in a melting furnace; and chemically analyzing and evaluating the melted quantity of chips with a chemical analyzer.

7. The process of claim 5, wherein the step of inspecting comprises:

extracting a quantity of chips from the mixture of chips;

mixing the extracted quantity of chips so as to generate a sample that is representative of the dried mixture of chips;

melting the extracted quantity of chips in a melting furnace; and chemically analyzing and evaluating the melted quantity of chips with a chemical analyzer.

* * * * *